US012596388B2

(12) United States Patent  
Aldinger

(10) Patent No.: US 12,596,388 B2  
(45) Date of Patent: Apr. 7, 2026

(54) OPTIMIZED CONTROL OF OILFIELD SEPARATOR LEVEL AND DUMP VALVES

(71) Applicant: Devon Energy Corporation, Oklahoma City, OK (US)

(72) Inventor: Trevor Aldinger, Gillette, WY (US)

(73) Assignee: Devon Energy Corporation, Oklahoma City, OK (US)

( * ) Notice: Subject to any disclaimer, the term of this patent is extended or adjusted under 35 U.S.C. 154(b) by 0 days.

(21) Appl. No.: 18/418,803

(22) Filed: Jan. 22, 2024

(65) Prior Publication Data

US 2024/0248497 A1 Jul. 25, 2024

Related U.S. Application Data

(60) Provisional application No. 63/440,289, filed on Jan. 20, 2023.

(51) Int. Cl.  
    *G05D 9/00*     (2006.01)  
    *G01F 23/32*     (2006.01)

(52) U.S. Cl.  
    CPC .............. *G05D 9/00* (2013.01); *G01F 23/32* (2013.01)

(58) Field of Classification Search  
    CPC ...... G05D 9/12; G05D 7/0166; G05D 7/0617; G01F 23/32  
    USPC ................................................ 210/740, 744  
    See application file for complete search history.

(56) References Cited

U.S. PATENT DOCUMENTS

| | | | |
|---|---|---|---|
| 2,649,771 A | 8/1953 | Sloan | |
| 2,653,623 A | 9/1953 | William et al. | |
| 2,944,562 A | 7/1960 | Glasgow et al. | |
| 2,945,102 A * | 7/1960 | Smith .................... | H01H 35/18 |
| | | | 200/84 C |
| 3,052,254 A | 9/1962 | Parks | |
| 3,128,784 A | 4/1964 | Parks | |
| 3,765,442 A * | 10/1973 | Nettles ..................... | G05D 9/12 |
| | | | 137/391 |
| 3,840,044 A | 10/1974 | Harris et al. | |
| 3,890,478 A * | 6/1975 | Riddel ................... | H01H 35/18 |
| | | | 340/623 |
| 4,000,989 A | 1/1977 | Dunegan | |
| 4,181,021 A * | 1/1980 | Harris ..................... | G01F 23/32 |
| | | | 73/317 |
| 4,436,109 A | 3/1984 | Taylor | |

(Continued)

FOREIGN PATENT DOCUMENTS

WO      2010034325 A1      4/2010

*Primary Examiner* — Hailey K. Do  
(74) *Attorney, Agent, or Firm* — Crowe & Dunlevy, P.C.

(57) ABSTRACT

A dump valve system controls the level of a liquid inside a vessel that includes a liquid discharge. The dump valve system includes an automatic dump valve connected downstream from the liquid discharge and configured to adjust the flow rate of the liquid through the liquid discharge, a float inside the vessel, a float arm connected to the float, and an inclinometer attached to the float arm and configured to output an angular disposition signal representative of the angular disposition of the float arm. The dump valve system can also include a flow meter configured to measure the flow rate of liquids discharged from the automatic dump valve and output a flow rate signal representative of the measured flow rate. A control module is configured to adjust the operation of the automatic dump valve in response to the flow rate signal and the angular disposition signal.

10 Claims, 3 Drawing Sheets

(56)                    References Cited

U.S. PATENT DOCUMENTS

| | | | |
|---|---|---|---|
| 4,530,463 A | | 7/1985 | Hiniker et al. |
| 4,542,765 A | | 9/1985 | Glasgow et al. |
| 4,543,973 A | | 10/1985 | Ho |
| 4,700,738 A | | 10/1987 | Frese et al. |
| 4,838,303 A | * | 6/1989 | Goans ................. G01F 23/0038 |
| | | | 137/434 |
| 4,956,763 A | * | 9/1990 | Stewart, Jr. .............. G05D 9/12 |
| | | | 137/395 |
| 5,083,461 A | | 1/1992 | Winkler |
| 5,484,522 A | | 1/1996 | Entrekin |
| 5,992,448 A | | 11/1999 | Anderson et al. |
| 6,240,955 B1 | | 6/2001 | Anderson et al. |
| 6,354,323 B1 | | 3/2002 | Anderson |
| 6,938,637 B2 | | 9/2005 | Mcgill et al. |
| 7,204,143 B1 | | 4/2007 | Nicewarner |
| 7,392,822 B2 | | 7/2008 | Kimmell |
| 7,806,133 B1 | | 10/2010 | Stephens |
| 8,091,580 B2 | | 1/2012 | Gentry |
| 8,171,787 B2 | * | 5/2012 | Maruo ................... G01F 23/363 |
| | | | 73/317 |
| 8,261,769 B1 | | 9/2012 | Stephens |
| 8,534,313 B1 | | 9/2013 | Achterman |
| 9,895,630 B2 | * | 2/2018 | Adler ....................... G05D 9/12 |
| 10,386,865 B2 | * | 8/2019 | Cartwright ............. G06F 30/00 |
| 11,014,445 B2 | | 5/2021 | Hoover |
| 11,809,157 B2 | | 11/2023 | Jensen et al. |
| 12,104,712 B1 | | 10/2024 | Clark et al. |
| 2006/0088429 A1 | | 4/2006 | Pfieffer |
| 2007/0246101 A1 | | 10/2007 | Kimmell |
| 2010/0071784 A1 | | 3/2010 | Gentry |
| 2013/0032217 A1 | * | 2/2013 | Pesek ..................... G01F 25/10 |
| | | | 137/386 |
| 2015/0090342 A1 | | 4/2015 | Cartwright et al. |
| 2015/0107676 A1 | * | 4/2015 | Green ..................... G05D 9/12 |
| | | | 700/282 |
| 2024/0248497 A1 | | 7/2024 | Aldinger |

* cited by examiner

OPTIMIZED CONTROL OF OILFIELD SEPARATOR LEVEL AND DUMP VALVES

REFERENCE TO RELATED APPLICATIONS

This application claims the benefit of U.S. Provisional Patent Application Ser. No. 63/440,289 filed Jan. 20, 2023 entitled "Optimized Control of Oilfield Separator Level and Dump Valves," the disclosure of which is herein incorporated by reference as if fully set forth herein.

FIELD OF THE INVENTION

This invention relates generally to the field of dump valves, and more specifically, to a dump valve with an optimized control system.

BACKGROUND OF THE INVENTION

Recent changes to regulatory requirements have placed an increased interest on metering oil for federal royalties determination in non-conventional locations. Historically, lease automatic custody transfer (LACT) units located downstream from separators and bulk storage vessels were used to meter oil to sell and pay federal royalties. The LACT unit is designed to measure both the quantity and quality of petroleum produced from a well or group of wells. The LACT unit is sometimes referred to as the "cash register of the oilfield" because the measurements made by the LACT unit are used as inputs in determining how much money is exchanged for the produced crude oil, which in turn is used as the basis for various royalty calculations.

For the LACT unit to function properly, the flow rate, temperature, pressure and density of the crude oil must be controlled so the measurements fall within the conditions that were used to calibrate or prove the accuracy of the LACT unit. Fluctuations in the temperature, pressure, density and flow rate of the crude oil can impair the accuracy of the LACT unit.

Recent changes in federal regulatory requirements around royalty determination as well as ESG goals of large operators have pushed the limits on how production facilities are built and operated to meet these new changes and goals. One fundamental shift was moving the royalty measuring point from the LACT unit further upstream in the production process to the separator oil dump line. This was due to the effort of reducing the number of oil storage tanks as they are a very common place for fugitive emissions to occur. The reduction of oil tanks means less places for fugitive emissions to occur but also places some burden on the operators. It was also due to federal regulations that do not allow oil from diverse interests to be metered together in one single measurement point.

It is very commonplace to have large, multi-well facilities with diverse royalty interest and royalty rates. Since it is not permitted to combine diverse interest production without determining royalty first, historically, the way to manage the production from the various wells and leases was to set dedicated oil storage tanks per well or lease. There would then be a LACT for each set of tanks or lease so that all oil from the wells or lease could be metered in accordance with regulations. While this method works, it requires a lot of storage tanks and capital costs to the production facility.

One common solution was to meter and determine oil production and royalties before the production storage tanks. This would allow operators to set less storage tanks since oil that has been metered and royalty determinations made can be combined into common storage tanks and sold to a purchaser. Federal regulations allowed for the metering technology that operators chose to utilize as it was already commonplace in LACT units, but the inherent operation and conditions of a separator pushed the limits of the regulations. Regulations place strict and somewhat narrow windows around metering conditions. The flow rate, temperature, pressure and density of the crude oil must be controlled so the measurements fall within the conditions that were used to calibrate or prove the accuracy of the meter. In general, traditional separator operation methods do not breed consistency in any of the previously mentioned parameters.

Separator vessels are typically large, pressurized weirs that separate oil, water and gas based on the relative densities of those fluids. The separator vessel is designed to dump the separated fluids at a rate that approximates the input rate to the separator from the well, while holding the fluids in the vessel for a residence time and pressure that encourages good separation of the gases, crude oil and water-based fluids. If the vessel discharges the fluids too rapidly, gases may become entrained in the crude oil discharge line, which can impair the function of flow meters located downstream from the separator vessel. If the vessel discharges the fluids too slowly, fluids may accumulate in the separator and lead to an emergency shut down (ESD) event.

In the past, mechanical, electrical or pneumatic dump valves have been used to control the flow of crude oil through the discharge line from the separator vessel. In some applications, a separate dump valve is also used to control the flow of water-based fluids from the vessel. In each case, a float or indicator is often used to determine the interface between the heavier water-based fluids and the lighter crude oil, or between the crude oil and gases inside the separator. As the float moves up and down inside the separator, the dump valve is opened and closed to permit or prohibit the discharge of crude oil or water from the separator.

Basic dump valves are mechanically operated and employ a linkage between the float arm and the dump valve. Although widely adopted, the use of conventional mechanical dump valves may be insufficient for volatile wells, particularly with the increased demands on the corresponding metering system directly downstream from the vessel.

Electronic and pneumatic valves have been used as an alternative to conventional mechanical dump valves, but remain insufficient for certain applications. In particular, modern pneumatic and electric dump valves tend to be installed with a simple single point level controller that limits valve stroke that results in a relatively fixed dump rate. For example, if the operator sets the stroke on the valve to provide an estimated flowrate of about 1,000 barrels/day at 50 psig operating pressure and the well temporarily increases production to a rate of 3,000 barrels/day for 30 minutes, the limited stroke range of the dump valve will not open enough to discharge the incoming fluid, which will result in an increased level inside the separator and an emergency shut down (ESD) event. In this way, existing level controllers and dump valves are limited by vessel level monitoring as well as a restricted and narrowly defined dump rate.

Accordingly, there is a need for an improved vessel level and dump valve control system that permits a wider range of dump rates as well as monitors the level in the vessel more than a single, static level point. It is to this and other deficiencies in the prior art that the present invention is directed.

SUMMARY OF THE INVENTION

In some embodiments, the present disclosure is directed at a dump valve system for controlling the level of a liquid inside a vessel that includes a liquid discharge. The dump valve system includes an automatic dump valve connected downstream from the liquid discharge and configured to adjust the flow rate of the liquid through the liquid discharge, a float inside the vessel, a float arm connected to the float and an inclinometer attached to the float arm and configured to output an angular disposition signal representative of the angular disposition of the float arm. The dump valve system further includes a control module configured to adjust the operation of the automatic dump valve in response to the angular disposition signal.

In other embodiments, the present disclosure is directed at a dump valve system for controlling the level of a liquid inside a vessel that includes a liquid discharge. In these embodiments, the dump valve system has an automatic dump valve connected downstream from the liquid discharge and configured to adjust the flow rate of the liquid through the liquid discharge, a float inside the vessel, a float arm connected to the float and a flow meter configured to measure the flow rate of liquids discharged from the automatic dump valve and output a flow rate signal representative of the measured flow rate. The dump valve system further includes a control module configured to adjust the operation of the automatic dump valve in response to the flow rate signal.

In yet other embodiments, the present disclosure is directed at a dump valve system for controlling the level of a liquid inside a vessel that includes a liquid discharge. Here, the dump valve system includes an automatic dump valve connected downstream from the liquid discharge and configured to adjust the flow rate of the liquid through the liquid discharge, a float inside the vessel, a float arm connected to the float, an inclinometer attached to the float arm and configured to output an angular disposition signal representative of the angular disposition of the float arm, and a flow meter configured to measure the flow rate of liquids discharged from the automatic dump valve and output a flow rate signal representative of the measured flow rate. The control module is configured to adjust the operation of the automatic dump valve in response to the flow rate signal and the angular disposition signal.

DETAILED DESCRIPTION

Figure 1A:
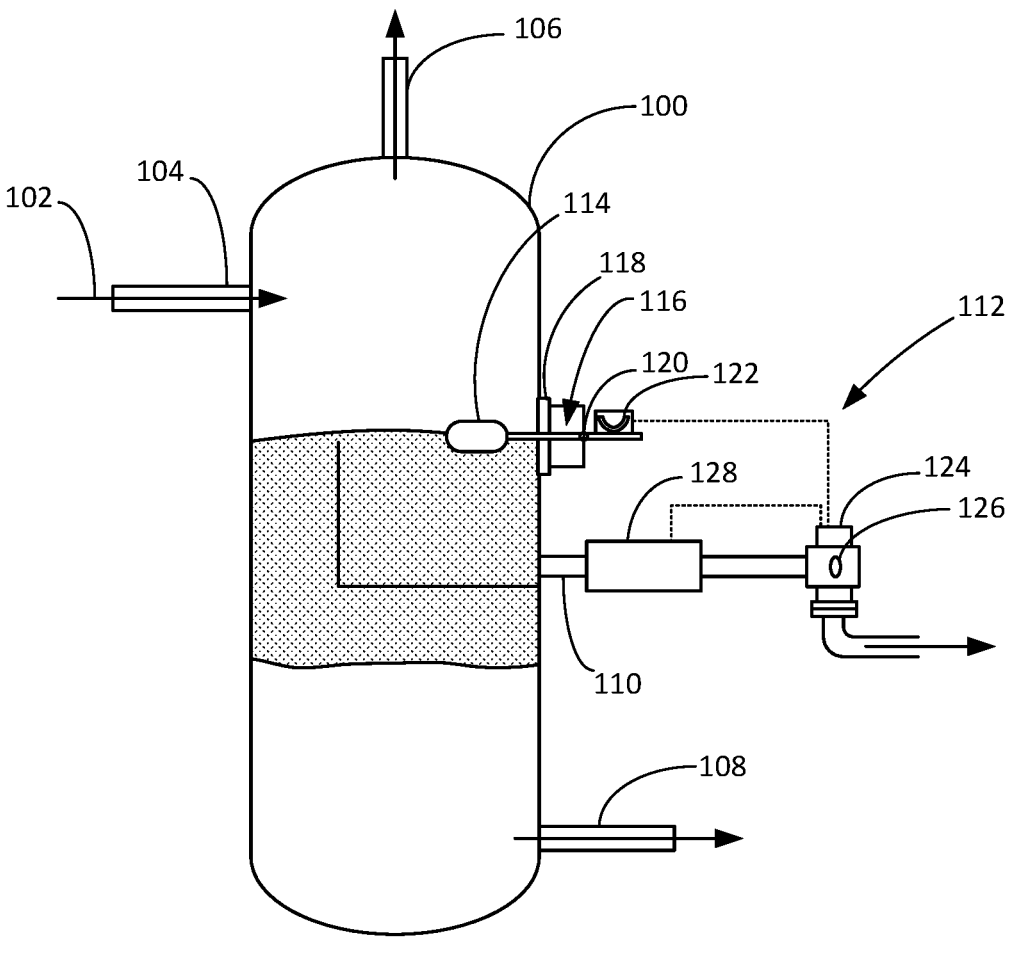
FIG. 1A is a cross-sectional depiction of a three phase separator with a dump valve system operating at a design dump rate.

Turning first to FIG. 1A, shown therein is a vessel 100 that is a three phase separator configured to separate a multiphase feed stream 102 from a well (not shown). The vessel 100 includes an inlet 104, a gas discharge 106, a water discharge 108 and an oil discharge 110. In accordance with well-established petroleum fluid separation mechanics, the multiphase feed stream 102 is injected into the separator 100 under pressure, where the constituent components separate according to their relative densities. The gas is discharged through the gas discharge 106, the water is discharged from the water discharge 108, and the liquid petroleum products (e.g., crude oil) are discharged through the oil discharge 110.

A dump valve system 112 is used to control the level of the liquid petroleum products in the vessel 100. The dump valve system 112 includes a float 114, a float arm 116, a housing 118, a pivot 120, an inclinometer 122, a control module 124 and an automatic dump valve 126. In some embodiments, the flow meter 128 is connected between the automatic dump valve 126 and the oil discharge 110. In this configuration, the dump valve 126 regulates the flow of petroleum liquids released through the oil discharge 110, while maintaining the pressure of the fluids as they pass through the flow meter 128. The flow meter 128 is configured to measure the flow rate of liquid petroleum products discharged through the oil discharge 110 and output a flow rate signal representative of the flow rate of fluids passing through the flow meter 128. The control module 124 can include electronic control systems that are adapted to adjust the operation of the automatic dump valve 126 according to a control scheme in response to one or more inputs from the inclinometer 122 and flow meter 128.

Figures 2A, 2B:
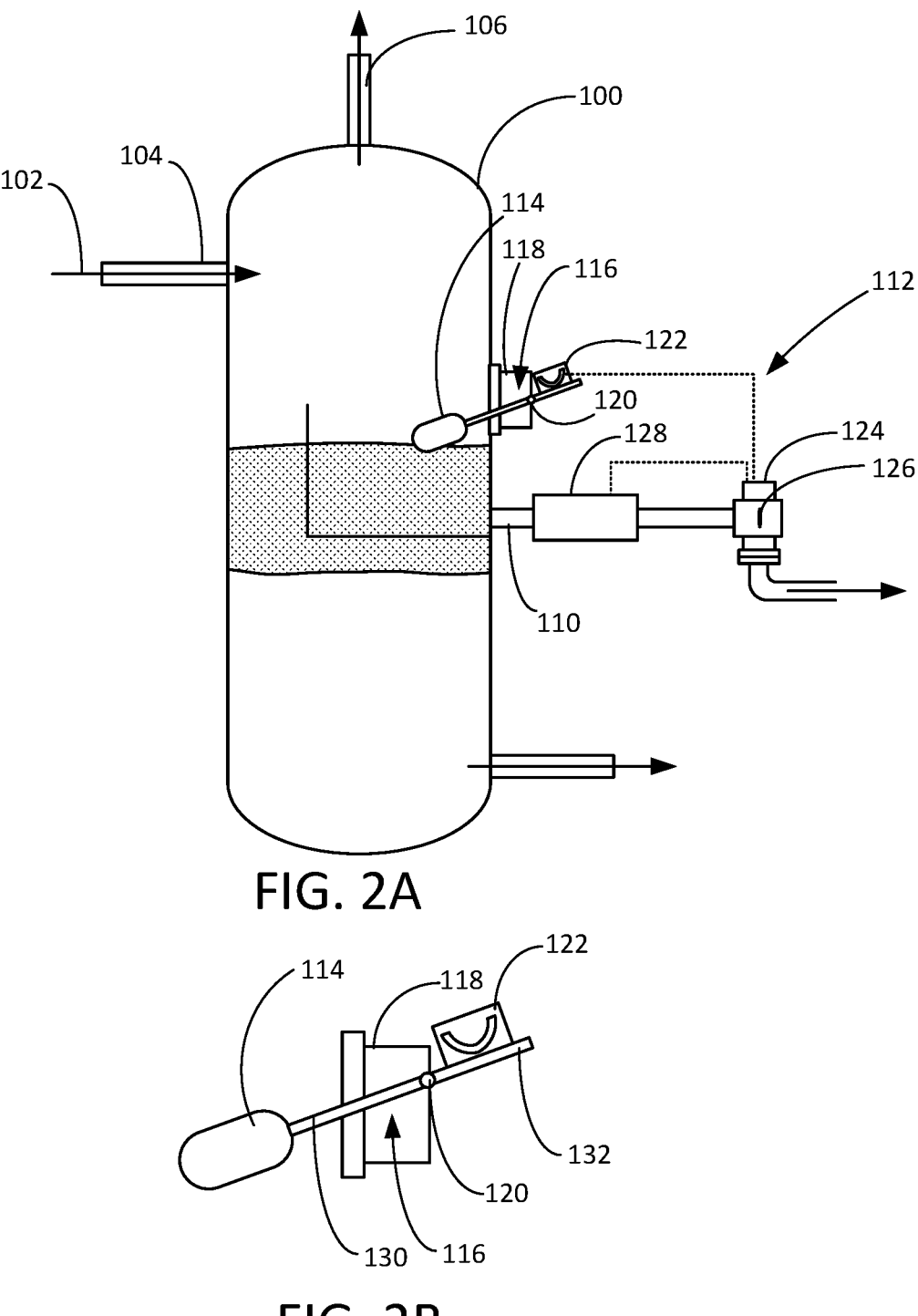
FIG. 2A is a cross-sectional depiction of a three phase separator with the dump valve system decreasing the dump rate in response to a reduction in the level of crude oil in the separator.
FIG. 2B is a close-up view of the dump valve system from FIG. 2A.
Figure 3A:
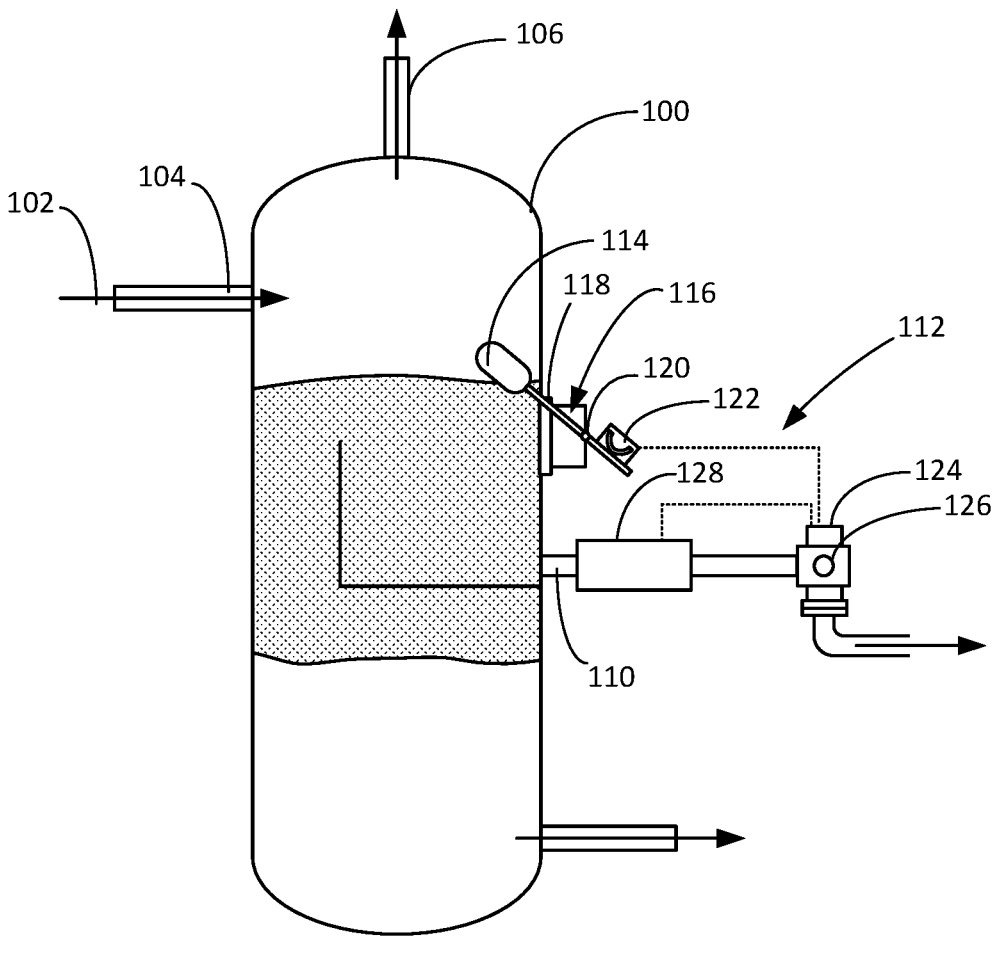
FIG. 3A is a cross-sectional depiction of a three phase separator with the dump valve system increasing the dump rate in response to an increase in the level of crude oil in the separator.

In exemplary embodiments, the float 114 is designed and weighted to rest at the interface of the liquid petroleum products and the gaseous petroleum products inside the vessel 100. As the level of the liquid petroleum products drops in the vessel 100, the float 114 also drops (as depicted in FIG. 2A). As the level of the liquid petroleum products rises inside the vessel 100, the float 114 also rises (as depicted in FIG. 3A).

The float 114 is connected to the float arm 116, which extends through the wall of the vessel 100 into the housing 118. The float arm 116 can be connected to and through the pivot 120 inside the housing 118. In this way, the float arm 116 includes a proximal portion 130 between the pivot 120 and the float 114 and a distal portion 132 outboard of the pivot 120. As the float 114 rises inside the vessel 100, the distal portion 132 of the float arm 116 drops beyond the pivot 120. Conversely, as the float 114 drops inside the vessel 110, the distal portion 132 of the float arm 116 raises beyond the pivot 120. In some embodiments, the float arm 116 is a unitary member that is configured to rock back and forth on the pivot 120. In other embodiments, the float arm 116 includes separated proximal and distal portions 130, 132 and the pivot 120 includes a shaft that transfers the rotation of the proximal portion 130 to the distal portion 132. In yet other embodiments, the float arm 116 includes multiple interconnected segments such that movement of the float arm segment attached to the float 114 causes the portion of the float arm with the inclinometer 122 to move in the same or opposite direction.

Figure 3B:
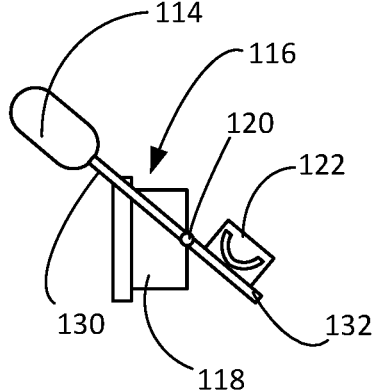
FIG. 3B is a close-up view of the dump valve system from FIG. 3A.

The inclinometer 122 can be attached to the proximal portion 130 or distal portion 132 of the float arm 116. The inclinometer 122 is configured to evaluate the angle of the float arm 116, e.g., with reference to a horizontal or other baseline reading and output an angular disposition signal. In exemplary embodiments, the angular disposition signal is an electric signal, which may be analog or digital. For example, in FIGS. 1A and 1B, the inclinometer 122 could be configured to output an angular disposition signal indicating that the float arm 116 is in a substantially horizontal position. In contrast, the inclinometer 122 might indicate that the float arm 116 is declined at an angle of about-20 degrees in FIGS. 2A and 2B, and inclined at an angle of about 45 degrees in FIGS. 3A and 3B.

The control module 124 can be located on the vessel 100, on the housing 118, on the float arm 116, on the automatic dump valve 126 (as shown), or elsewhere in an operative position to efficiently control the operation of the automatic dump valve 126. The control module 124 is programmed to process the angular disposition signal from the inclinometer 122 and the flow rate signal from the flow meter 128 and then output a control signal to adjust the adjust the position of the automatic dump valve 126 within a range of positions from fully open to fully closed to intelligently control the level of the petroleum fluids in the vessel 100. The automatic dump valve 126 can be an electrically or pneumatically actuated valve. If the automatic dump valve 126 is pneumatically actuated, an intervening pneumatic driver converts the electrical signals from the control module 124 to a pneumatic signal useable by the automatic dump valve 126. The pneumatic driver can be integrated into the control module 124.

Figure 1B:
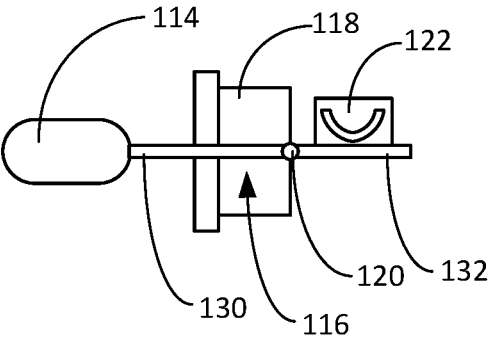
FIG. 1B is a close-up view of the dump valve system from FIG. 1A.

For example, in FIGS. 1A and 1B, the inclinometer 122 indicates that the float arm 116 is relatively level or horizontal, which can be an indication that the level of the liquid petroleum products in the vessel is within an appropriate range. If the output from the flow meter 128 also indicates a flow rate within an appropriate range, the control module 124 is programmed to output a responsive control signal to maintain the automatic dump valve 126 in its current position, which is depicted as partially open in FIGS. 1A and 1B.

In contrast, if the level of the liquid petroleum products in the vessel 100 decreases as indicated in FIG. 2A, the inclinometer 122 outputs a corresponding angular disposition signal to the control module 124 based on the angular disposition of the float arm 116. Based on this input and the flow rate signal from the flow meter 128, the control module 124 is programmed to output a corrective control signal to partially or completely close the automatic dump valve 126. If the level of fluid inside the vessel 100 does not increase at a sufficient rate based on the feed stream 102, the control module 124 can be programmed to further close the automatic dump valve 126 to further reduce the dump rate through the automatic dump valve 126. Conversely, if the level of the liquid petroleum products in the vessel 100 increases as indicted in FIG. 3A, as reflected by a change in the angular disposition signal output by the inclinometer 122, the control module 124 completely or partially opens the automatic dump valve 126 based on the inputs received from the inclinometer 122 and flow meter 128. Again, if the initial dump rate measured by the flow meter 128 is insufficient given the flow rate of feed stream 102, the control module 124 can further open the automatic dump valve 126 to increase the dump rate to programmed rates or float level proportional rates to accommodate changing conditions in the vessel 100.

It will be noted that the control module 124 can be configured to adjust the automatic dump valve 126 based on one or both of the output signals generated by the inclinometer 122 and flow meter 128. If, for example, the inclinometer 122 outputs an angular disposition signal indicating that the level of the petroleum liquids in the vessel 100 is acceptable but the flow rate signal produced by the flow meter 128 is outside a desired range, the control module 124 can open or close the automatic dump valve 126 to bring the flow rate of the oil discharge 110 into the desired range. If increasing or decreasing the flow rate through the automatic dump valve 126 affects the level of the petroleum products in the vessel 100, the inclinometer 122 will detect the change in the angular position of the float arm 116 and the control module 124 can send a corrective control signal, as necessary, to the automatic dump valve 126. Thus, in exemplary embodiments, the dump valve system 112 is configured to adjust the operation of the automatic dump valve 126 in response to measurements from one or both of the inclinometer 122 and the flow meter 128.

Although the dump valve system 112 is depicted in use with a three phase separator, the dump valve system 112 can also be used to control the level of fluids in other vessels, including tank batteries, bulk storage tanks, water tanks, and other vessels in which fluid levels must be maintained by controlling the discharge of fluids from the vessel. Accordingly, the term "vessel" as used in this disclosure should be construed to cover any vessel in which the dump valve system 112 can be used to control the level of any liquid products inside the vessel 100. It will also be appreciated that a dump valve 126 can be connected to the water discharge 108 and configured for control by the control module 124 with inputs from a dedicated flow meter connected to the water discharge.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

It is claimed:

1. A dump valve system for controlling a level of a liquid inside a vessel that includes a liquid discharge, the dump valve system comprising:
    an automatic dump valve connected downstream from the liquid discharge and configured to adjust a flow rate of the liquid through the liquid discharge;
    a housing attached to the vessel;
    a pivot inside the housing;
    a float inside the vessel;
    a float arm connected to the float, wherein the float arm extends through the vessel into the housing, and wherein the float arm is connected to the pivot such that the float arm comprises:
        a proximal portion between the pivot and the float; and
        a distal portion outboard of the pivot;
    an inclinometer attached to the distal portion of the float arm and configured to evaluate an angle of the float arm and output an angular disposition signal representative of an angular disposition of the float arm; and
    a control module configured to adjust an operation of the automatic dump valve in response to the angular disposition signal.

2. The dump valve system of claim 1, further comprising a flow meter configured to measure the flow rate of liquids discharged from the automatic dump valve and output a flow rate signal representative of the measured flow rate.

3. The dump valve system of claim 1, wherein the control module is configured to adjust the automatic dump valve to change a dump rate of fluids passing through the automatic dump valve based on the angular disposition signal from the inclinometer.

4. The dump valve system of claim 2, wherein the control module is configured to adjust the operation of the automatic dump valve based on the flow rate signal.

5. A dump valve system for controlling a level of a liquid inside a vessel that includes a liquid discharge, the dump valve system comprising:

an automatic dump valve connected downstream from the liquid discharge and configured to adjust a flow rate of the liquid through the liquid discharge;

a float inside the vessel;

a float arm connected to the float;

an inclinometer attached to the float arm and configured to output an angular disposition signal representative of an angular disposition of the float arm;

flow meter configured to measure the flow rate of liquids discharged from the automatic dump valve and output a flow rate signal representative of the measured flow rate; and a control module configured to adjust an operation of the automatic dump valve in response to the flow rate signal and the angular disposition signal.

6. The dump valve system of claim 5, wherein the control module is configured to adjust the automatic dump valve to change a dump rate of fluids passing through the automatic dump valve based on the angular disposition signal from the inclinometer.

7. A dump valve system for controlling a level of a liquid inside a vessel that includes a liquid discharge, the dump valve system comprising:

an automatic dump valve connected downstream from the liquid discharge and configured to adjust a flow rate of the liquid through the liquid discharge;

a float inside the vessel;

a housing attached to the vessel;

a pivot inside the housing;

a float arm connected to the float, wherein the float arm extends through the vessel into the housing, and wherein the float arm is connected to the pivot such that the float arm comprises:

a proximal portion between the pivot and the float; and a distal portion outboard of the pivot;

an inclinometer attached to the float arm and configured to output an angular disposition signal representative of an angular disposition of the float arm;

a flow meter configured to measure the flow rate of liquids discharged from the automatic dump valve and output a flow rate signal representative of the measured flow rate; and a control module configured to adjust an operation of the automatic dump valve in response to the flow rate signal and the angular disposition signal.

8. The dump valve system of claim 7, wherein the inclinometer is located on the proximal portion of the float arm.

9. The dump valve system of claim 7, wherein the inclinometer is located on the distal portion of the float arm.

10. The dump valve system of claim 7, wherein the float arm comprises a plurality of interconnected segments.

* * * * *